United States Patent
Rao et al.

(10) Patent No.: US 10,019,190 B2
(45) Date of Patent: Jul. 10, 2018

(54) REAL-TIME ABNORMAL CHANGE DETECTION IN GRAPHS

(71) Applicant: NEC Laboratories America, Inc., Princeton, NJ (US)

(72) Inventors: Kunal Rao, Plainsboro, NJ (US); Giuseppe Coviello, Plainsboro, NJ (US); Srimat Chakradhar, Manalapan, NJ (US); Souvik Bhattacherjee, College Park, MD (US); Srihari Cadambi, Princeton, NJ (US)

(73) Assignee: NEC Corporation (JP)

( * ) Notice: Subject to any disclaimer, the term of this patent is extended or adjusted under 35 U.S.C. 154(b) by 344 days.

(21) Appl. No.: 14/831,775

(22) Filed: Aug. 20, 2015

(65) Prior Publication Data

US 2016/0110404 A1    Apr. 21, 2016

Related U.S. Application Data

(60) Provisional application No. 62/118,510, filed on Feb. 20, 2015, provisional application No. 62/118,511, filed on Feb. 20, 2015, provisional application No. 62/064,083, filed on Oct. 15, 2014.

(51) Int. Cl.
  *G06F 17/30* (2006.01)
  *G06F 3/06* (2006.01)
  *G06T 11/20* (2006.01)

(52) U.S. Cl.
  CPC .......... *G06F 3/0638* (2013.01); *G06F 3/0604* (2013.01); *G06F 3/067* (2013.01); *G06F 3/0619* (2013.01); *G06F 17/30368* (2013.01); *G06F 17/30371* (2013.01); *G06F 17/30374* (2013.01); *G06F 17/30424* (2013.01);
  (Continued)

(58) Field of Classification Search
  None
  See application file for complete search history.

(56) References Cited

U.S. PATENT DOCUMENTS 5,675,720 A * 10/1997 Sato ................. G06T 17/00
                                                    345/419
9,639,610 B1 * 5/2017 Jurgens ............ G06F 17/30864
(Continued)

OTHER PUBLICATIONS

Anderson, et al., "CouchDB: The Definitive Guide Time to Relax. O'Reilly Media, Inc.", 1st edition Jan. 2010, 272 pages.
(Continued)

*Primary Examiner* — Son T Hoang
(74) *Attorney, Agent, or Firm* — Joseph Kolodka

(57) ABSTRACT

A method for detecting abnormal changes in real-time in dynamic graphs. The method includes extracting, by a graph sampler, an active sampled graph from an underlying base graph. The method further includes merging, by a graph merger, the active sampled graph with graph updates within a predetermined recent time period to generate a merged graph. The method also includes computing, by a graph diameter computer, a diameter of the merged graph. The method additionally includes determining, by a graph diameter change determination device, whether a graph diameter change exists. The method further includes generating, by an alarm generator, a user-perceptible alarm responsive to the graph diameter change.

20 Claims, 7 Drawing Sheets

(52) U.S. Cl.
CPC .. *G06F 17/30867* (2013.01); *G06F 17/30876* (2013.01); *G06F 17/30958* (2013.01); *G06T 11/206* (2013.01)

(56) References Cited

U.S. PATENT DOCUMENTS

2004/0254727 A1* 12/2004 Ockerse ................ G01C 17/28
                                                            701/535
2015/0254569 A1*  9/2015 Baughman ............. H04L 47/70
                                                            706/52

OTHER PUBLICATIONS

Mike Buerli, "The current state of graph databases", Department of Computer Science Cal Poly San Luis Obispo, Dec. 2012, pp. 1-7.
Cheng, et al., "Kineograph: Taking the pulse of a fast-changing and connected world", In Proceedings of the 7th ACM European Conference on Computer Systems, EuroSys'12, Apr. 2012, pp. 85-98.
Ediger, et al., "Stinger: high performance data structure for streaming graphs", In IEEE Conference on High Performance Extreme Computing, HPEC 2012, Sep. 2012, pp. 1-5.
Gonzalez, et al., "Distributed graph-parallel computation on natural graphs", In Proceedings of the 10th USENIX Conference on Operating Systems Design and Implementation, OSDI'12, Oct. 2012, pp. 17-30.
Gubbi, et al., "Internet of things (iot): A vision, architectural elements, and future directions", Future Gener. Comput. Syst., 29(7), Sep. 2013, pp. 1645-1660.
Iordanov, Hypergraphdb: "A generalized graph database", In Proceedings of the 2010 International Conference on Web-age Information Management, WAIM'10, Jukl 2010, pp. 25-36.
Kang, et al., "Pegasus: A peta-scale graph mining system implementation and observations", In Proceedings of the 2009 Ninth IEEE International Conference on Data Mining, ICDM '09, IEEE Computer Society, Dec. 2009, pp. 229-238.
Kyrola, et al., "Graphchi: Large-scale graph computation on just a pc", In Proceedings of the 10th USENIX Conference on Operating Systems Design and Implementation, OSDI'12, Oct. 2012, pp. 31-46.
Low, et al., "Distributed graphlab: A framework for machine learning and data mining in the cloud", Proc. VLDB Endow., 5(8), Apr. 2012, pp. 716-727.
Malewicz, et al., "Pregel: A system for large-scale graph processing", In Proceedings of the 2010 ACM SIGMOD International Conference on Management of Data, SIGMOD '10, Jun. 2010, pp. 135-146.
Mondal, et al., "Managing large dynamic graphs efficiently", In Proceedings of the 2012 ACM SIGMOD International Conference on Management of Data, SIGMOD '12, May 2012, pp. 145-156.
Murray, et al., "Naiad: A timely dataflow system", In Proceedings of the Twenty-Fourth ACM Symposium on Operating Systems Principles, SOSP '13, Nov. 2013, pp. 439-455.
Page, et al., "The pagerank citation ranking: Bringing order to the web. In Proceedings of the 7th International World Wide Web Conference", Jan. 1998, pp. 161-172.
Roy, et al., "X-stream: Edge-centric graph processing using streaming partitions", In Proceedings of the Twenty-Fourth ACM Symposium on Operating Systems Principles, SOSP '13, Nov. 2013, pp. 472-488.
Sherif Sakr, "Processing large-scale graph data: A guide to current technology", IBM Corporation, Jun. 2013, pp. 1-13.
Shao, et al., "Trinity: A distributed graph engine on a memory cloud", Proceedings of the 2013 ACM SIGMOD International Conference on Management of Data, SIGMOD '13, Jun. 2013, pp. 505-516.
Xin, et al., "Graphx: A resilient distributed graph system on spark", First International Workshop on Graph Data Management Experiences and Systems, Grades '13, Jun. 2013, pp. 2:1-2:6.

The Appache Cassandra Project, 2015. Available at: http://cassandra.apache.org/.
Gridgrain Systems, Inc., Gridgrain, In Memory Data Fabric, 2015. Available at: http://gridgain.com/.
The Apache Software Foundation. Last Published: Jul. 7, 2015. Available at: http://hadoop.apache.org/.
Infogrid Web Database, Last Published Jan. 2015. Available at: http://infogrid.org/trac/.
Facebook Statistics, Copyright 2015. Available at: https://blog.kissmetrics.com/facebook-statistics/.
Twitter, Copyright 2015. Available at: https://dev.twitter.com/streaming/overview.
Franz, Inc., W3C. Allegrograph rdfstore web 3.0's database. Sep. 2009. Availabler at: http://www.franz.com/agraph/allegrograph/.
Apache Software Foundation. Copyright 2014. Available at: https://storm.incubator.apache.org/.
Faunus, Graph Analytics Engine, "Quick Start," Release notes dated Sep. 5, 2014, retrieved on Aug. 20, 2015, pp. 1-2. Available at: http://thinkaurelius.github.io/faunus/.
Titan, Distributed Graph Database, "Quick Start," Release notes dated Jun. 9, 2015, retrieved on Aug. 20, 2015, pp. 1-2. Available at: http://thinkaurelius.github.io/titan/.
Graph 500, "The Graph 500 List," Brief Introduction, Jul. 2015, retrieved on Aug. 20, 2015, pp. 1-2. Available at: http://www.graph500.org/.
Hazelcast, "Hazelcast the Leading In-Memory Data Grid—Hazelcast.com," latest version Jul. 2015, retrieved on Aug. 20, 2015, pp. 1-3. Available at http://hazelcast.com/.
Zawodny, "Redis: Lightweight key/value Store That Goes the Extra Mile," Aug. 31, 2009, retrieved Aug. 20, 2015, Linux Magazine, pp. 1-3. Available at: http://www.linux-mag.com/id/7496/.
Neo4j, "Neo4j, the World's Leading Graph Database," Feb. 8, 2015, retrieved Aug. 20, 2015, pp. 1-10. Available at: http://neo4j.com/.
InfiniteGraph, "InfiniteGraph, Objectivity," Jul. 31, 2015, retrieved Aug. 20, 2015, pp. 1-5. Available: http://www.objectivity.com/products/infinitegraph/.
OrientDB, "OrientDB—OrientDB Multi-Model No SQL DatabaseOrientDB Multi-Model NoSQL Database," Jul. 2015, retrieved Aug. 20, 2015, pp. 1-2. Available at: http://www.orientechnologies.com/orientdb/.
Raffi Krikorian, New Tweets per second record, and how!, Aug. 2013. Available at: https://blog.twitter.com/2013/new-tweets-per-second-record-and-how.
Chen, W. et al., "Cardinality Change-based Early Detection of Large-scale Cyber-Attacks," Infocom, 2013 Proceedings IEEE, Apr. 2013. (pp. 1-9).
De Domenico, M. et al., "The Anatomy of a Scientific Rumor," Scientific Reports,vol. 3, No. 2980, Oct. 2013. (pp. 1-9).
Dijkstra, E. W., "A Note on Two Problems in Connexion with Graphs," Numerische Mathematik, col. 1, No. 1, Dec. 1959. (pp. 1-3).
Gaston, M.E., "Using Graph Diameter for Change Detection in Dynamic Networks," Australian Journal of Combinatorics, vol. 35, Jan. 2006. (pp. 299-311).
Karypis, G. et al., "A Fast and High Quality Multilevel Scheme for Partitioning Irregular Graphs," SIAM J. SCI. COMPUT. vol. 20, No. 1, Aug. 1998. (pp. 359-392).
Leskovec, J. et al., "Graphs over Time: Densification Laws, Shrinking Diameters and Possible Explanations," Proceedings of the eleventh ACM SIGKDD international conference on Knowledge discovery in data mining, Aug. 2005. (pp. 177-187).
Rozenshtein, R. et al., "Event Detection in Activity Networks," Proceedings of the 20th ACM SIGKDD international conference on Knowledge discovery and data mining, Aug. 2014. (pp. 1176-1185).
Kifer, D. et al., "Detecting Change in Data Streams," Proceedings of the Thirtieth international conference on Very large data bases, vol. 30, Aug. 2004. (pp. 180-191).
Wong, W. K, et al., "What's Strange About Recent Events (WSARE): An Algorithm for the Early Detection of Disease Outbreaks," Journal of Machine Learning Research, vol. 6, Dec. 2005. (pp. 1961-1998).

(56) References Cited

OTHER PUBLICATIONS

Gupta, M. et al., "Outlier Detection for Temporal Data: A Survey," IEEE Transactions on Knowledge and Data Engineering, vol. 26, No. 9, Sep. 2014. (pp. 2250-2267).
Backstrom, L. et al., "Group Formation in Large Social Networks: Membership, Growth, and Evolution," Proceedings of the 12th ACM SIGKDD international conference on Knowledge discovery and data mining, Aug. 2006. (pp. 44-54).
Aggarwal, C. et al., "Evolutionary Network Analysis: A Survey," ACM Computing Surveys, vol. 47, No. 1, Apr. 2014. (pp. 1-36).
Bilgin, C.C. et al., "Dynamic Network Evolution: Models, Clustering, Anomaly Detection," Rensselaer Polytechnic Institute. 2006. (pp. 1-13).
Kapsabelis, K.M. et al., "Investigation of Graph Edit Distance Cost Functions for Detection of Network Anomalies," Anziam Journal, vol. 48, Aug. 2007. (pp. 1-14).
Gao, X. et al., "A survey of graph edit distance," Pattern Anal Applic, Jan. 2009. (pp. 113-129).
Pincombe, B., "Anomaly Detection in Time Series of Graphs using ARMA Processes," www.asor.org, Dec. 2005. (pp. 1-10). Available at: www.asor.org.au/publication/files/dec2005/Bra-paper.pdf.
Bunke, H. et al., "Computer Network Monitoring and Abnormal Event Detection Using Graph Matching and Multidimensional Scaling," Advances in Data Mining. Applications in Medicine, Web Mining, Marketing, Image and Signal Mining, vol. 4065, Jul. 2006. (pp. 1-15).
Papadimitriou, P. et al., Web graph similarity for anomaly detection, J Internet Serv Appl, vol. 1, Feb. 2010. (pp. 19-30).
Berlingerio, M. et al., "NetSimile: A Scalable Approach to Size-Independent Network Similarity," arXiv:1209.2684, Sep. 2012. (pp. 1-12).
Koutra, D. et al., "Deltacon: A Principled Massive-Graph Similarity Function," arXiv:1304.4657, Apr. 2013. (pp. 1-11).
Rossi, R. et al., "Role-Dynamics: Fast Mining of Large Dynamic Networks," arXiv:1203.2200, Mar. 2012. (pp. 1-9).
Akoglu, L. et al., "Event Detection in Time Series of Mobile Communication Graphs," www3.cs.stonybrook.edu, 2010. (pp. 1-8). Available at: http://webcache.googleusercontent.com/search?q=cache:_X_DklaVPhQJ:www3.cs.stonybrook.edu/~leman/pubs/EVENTDETECTION_AkogluFaloutsos.pdf+&cd=1&hl=en&ct=clnk&gl=us.
Ide, T. et al.,"Eigenspace-based Anomaly Detection in Computer Systems," Proceedings of the tenth ACM SIGKDD international conference on Knowledge discovery and data mining, Aug. 2004. (pp. 440-449).
Sun, J. et al., "Less is More: Compact Matrix Decomposition for Large Sparse Graphs," Proceedings of the 2007 SIAM International Conference on Data Mining, Apr. 2007. (pp. 1-12).
Sun, J. et al., "GraphScope: Parameter-free Mining of Large Time-evolving Graphs," Proceedings of the 13th ACM SIGKDD international conference on Knowledge discovery and data mining, Aug. 2007. (pp. 1-10).
Aggarwal, C.C. et al., "Outlier Detection in Graph Streams," 2011 IEEE 27th International Conference on Data Engineering, Apr. 2011. (pp. 399-409).
Heard, N. et al., "Bayesian Anomaly Detection Methods for Social Networks," The Annals of Applied Statistics, vol. 4, No. 2, Aug. 2010. (pp. 1-18).
Mongiovi, M. et al., "NetSpot: Spotting Significant Anomalous Regions on Dynamic Networks," Proceedings of the SIAM International Conference on Data Mining, May 2013. (pp. 1-9).
Peel, L. et al., "Detecting change points in the large-scale structure of evolving networks," AAAI'15 Proceedings of the Twenty-Ninth AAAI Conference on Artificial Intelligence, Jan. 2015. (pp. 1-11).
Akoglu, L et al., "Graph based anomaly detection and description: a survey," Data Mining and Knowledge Discovery, vol. 29 Issue 3, May 2015. (pp. 1-63).

* cited by examiner

REAL-TIME ABNORMAL CHANGE DETECTION IN GRAPHS

RELATED APPLICATION INFORMATION

This application claims priority to provisional application Ser. No. 62/118,511, filed on Feb. 20, 2015, provisional application Ser. No. 62/118,510, filed on Feb. 20, 2015, and provisional application Ser. No. 62/064,083, filed on Oct. 15, 2014, each incorporated herein by reference.

This application is related to a patent application having attorney docket number 14037A, entitled "Large-Scale, Dynamic Graph Storage and Processing System", and a patent application having attorney docket number 14037B, entitled "Large-Scale, Dynamic Graph Storage and Processing System", which are commonly assigned and the disclosures of which are incorporated by reference herein in their entireties.

BACKGROUND

Technical Field

The present invention relates to information processing, and more particularly to real-time abnormal change detection in dynamic graphs.

Description of the Related Art

Information in several domains is often best represented in the form of graphs. Exemplary domains include, for example, social networks, transportation networks, biological networks, enterprise networks, and so forth. The entities in these networks form the vertices and the connections or interactions between the entities form the edges. For example, in a social network, people form the vertices, and their relationship and/or interactions form the edges. In an enterprise network, hosts form the vertices, and the network communications form the edges. Given that the data is modelled in this form, events happening in the real world continuously change the underlying graph structure. It is observed that different events change the graph in certain ways and there are certain peculiar events which change the structure of the underlying graph in very different ways.

Consider the spread of virus in the internet. The virus in a given host node in the network selects random Internet Protocol (IP) addresses in the network and infects those nodes in the network. The infection of a node by an already infected host is characterized by the addition of a directed edge from the infected host to the new node. Each infected node, in turn, replicates the same process. Virus spread usually occurs very fast. Therefore, a virus spread is characterized by the addition of a large number of edges in very small amount of time. These edges are not just randomly added but each node connects to a large number of hosts which increases the degree of the infecting host and this process is repeated for other nodes.

Another example is the spread of news on online social network sites like Twitter®. Here, the news spread starts by a particular user tweeting about an event and mentioning other users and adding some hashtags related to the event. This tweet is then received by his followers and users who have been mentioned in the tweet. These users in turn either retweet or post new tweets with the same hashtags and mention other users and the process continues. These kinds of spreads are quite common, however the degrees to which they propagate are different for different types of events. For example, some news about a natural calamity like a high magnitude earthquake affecting millions of people spreads very quickly among a large group of users over the entire network, while information about a local school being closed would spread only among a certain group of people within that locality.

Capturing these kinds of changes in the network in an online fashion as they are happening can be very useful and critical in some cases. However, a main drawback of the prior art is the lack of methods to detect abnormal changes in large and dynamic graphs in real-time. Thus, there is a need for real-time abnormal change detection in dynamic graphs.

SUMMARY

These and other drawbacks and disadvantages of the prior art are addressed by the present principles, which are directed to real-time abnormal change detection in dynamic graphs.

According to an aspect of the present principles, a method is provided for detecting abnormal changes in real-time in dynamic graphs. The method includes extracting, by a graph sampler, an active sampled graph from an underlying base graph. The method further includes merging, by a graph merger, the active sampled graph with graph updates within a predetermined recent time period to generate a merged graph. The method also includes computing, by a graph diameter computer, a diameter of the merged graph. The method additionally includes determining, by a graph diameter change determination device, whether a graph diameter change exists. The method further includes generating, by an alarm generator, a user-perceptible alarm responsive to the graph diameter change.

According to another aspect of the present principles, a computer program product is provided for detecting abnormal changes in real-time in dynamic graphs. The computer program product includes a computer readable storage medium having program instructions embodied therewith. The program instructions are executable by a computer to cause the computer to perform a method. The method includes extracting, by a graph sampler, an active sampled graph from an underlying base graph. The method further includes merging, by a graph merger, the active sampled graph with graph updates within a predetermined recent time period to generate a merged graph. The method also includes computing, by a graph diameter computer, a diameter of the merged graph. The method additionally includes determining, by a graph diameter change determination device, whether a graph diameter change exists. The method further includes generating, by an alarm generator, a user-perceptible alarm responsive to the graph diameter change.

According to yet another aspect of the present principles, a system is provided for detecting abnormal changes in real-time in dynamic graphs. The system includes a graph sampler for extracting an active sampled graph from an underlying base graph. The system further includes a graph merger for merging the active sampled graph with graph updates within a predetermined recent time period to generate a merged graph. The system also includes a graph diameter computer for computing a diameter of the merged graph. The system additionally includes a graph diameter change determination device for determining whether a graph diameter change exists. The system further includes an alarm generator for generating a user-perceptible alarm responsive to the graph diameter change.

These and other features and advantages will become apparent from the following detailed description of illustrative embodiments thereof, which is to be read in connection with the accompanying drawings.

BRIEF DESCRIPTION OF DRAWINGS

The disclosure will provide details in the following description of preferred embodiments with reference to the following figures wherein.

DETAILED DESCRIPTION OF PREFERRED EMBODIMENTS

Figure 1:
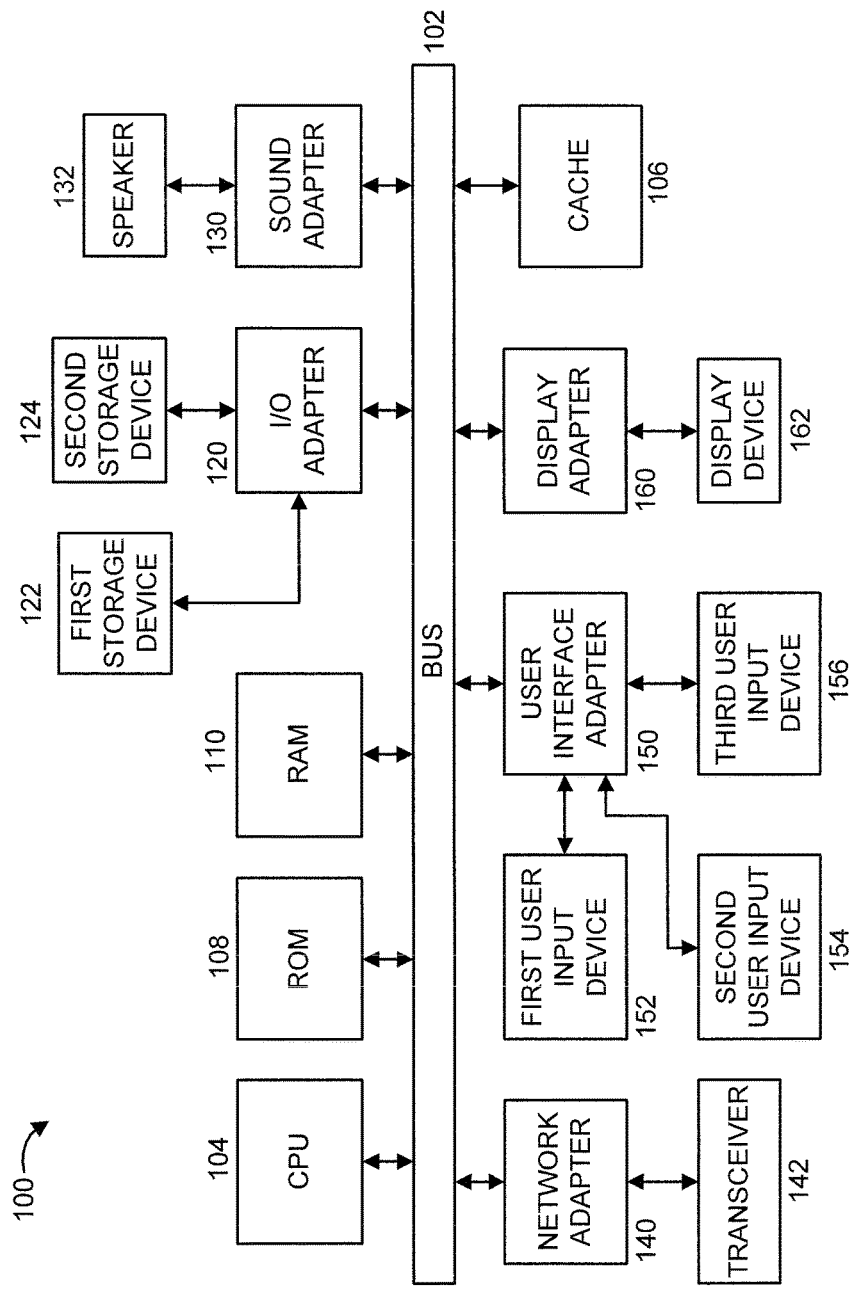
FIG. 1 shows an exemplary processing system 100 to which the present principles may be applied, according to an embodiment of the present principles.

Referring now in detail to the figures in which like numerals represent the same or similar elements and initially to FIG. 1, a block diagram illustrating an exemplary processing system 100 to which the present principles may be applied, according to an embodiment of the present principles, is shown. The processing system 100 includes at least one processor (CPU) 104 operatively coupled to other components via a system bus 102. A cache 106, a Read Only Memory (ROM) 108, a Random Access Memory (RAM) 110, an input/output (I/O) adapter 120, a sound adapter 130, a network adapter 140, a user interface adapter 150, and a display adapter 160, are operatively coupled to the system bus 102.

A first storage device 122 and a second storage device 124 are operatively coupled to system bus 102 by the I/O adapter 120. The storage devices 122 and 124 can be any of a disk storage device (e.g., a magnetic or optical disk storage device), a solid state magnetic device, and so forth. The storage devices 122 and 124 can be the same type of storage device or different types of storage devices.

A speaker 132 is operatively coupled to system bus 102 by the sound adapter 130. A transceiver 142 is operatively coupled to system bus 102 by network adapter 140. A display device 162 is operatively coupled to system bus 102 by display adapter 160.

A first user input device 152, a second user input device 154, and a third user input device 156 are operatively coupled to system bus 102 by user interface adapter 150. The user input devices 152, 154, and 156 can be any of a keyboard, a mouse, a keypad, an image capture device, a motion sensing device, a microphone, a device incorporating the functionality of at least two of the preceding devices, and so forth. Of course, other types of input devices can also be used, while maintaining the spirit of the present principles. The user input devices 152, 154, and 156 can be the same type of user input device or different types of user input devices. The user input devices 152, 154, and 156 are used to input and output information to and from system 100.

Of course, the processing system 100 may also include other elements (not shown), as readily contemplated by one of skill in the art, as well as omit certain elements. For example, various other input devices and/or output devices can be included in processing system 100, depending upon the particular implementation of the same, as readily understood by one of ordinary skill in the art. For example, various types of wireless and/or wired input and/or output devices can be used. Moreover, additional processors, controllers, memories, and so forth, in various configurations can also be utilized as readily appreciated by one of ordinary skill in the art. These and other variations of the processing system 100 are readily contemplated by one of ordinary skill in the art given the teachings of the present principles provided herein.

Figure 2:
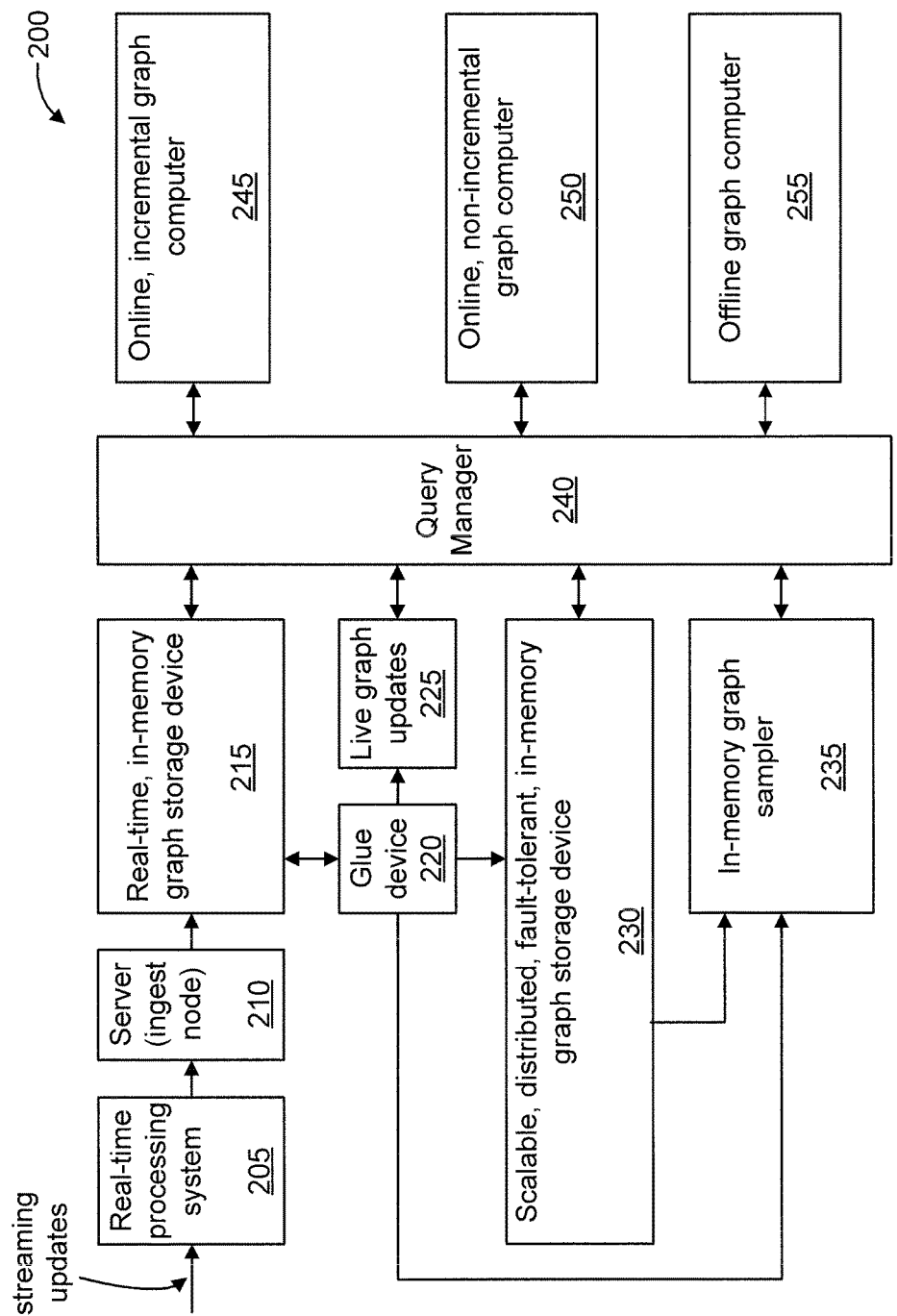
FIG. 2 shows an exemplary system 200 for large-scale, dynamic graph storage and processing, in accordance with an embodiment of the present principles.
Figure 3:
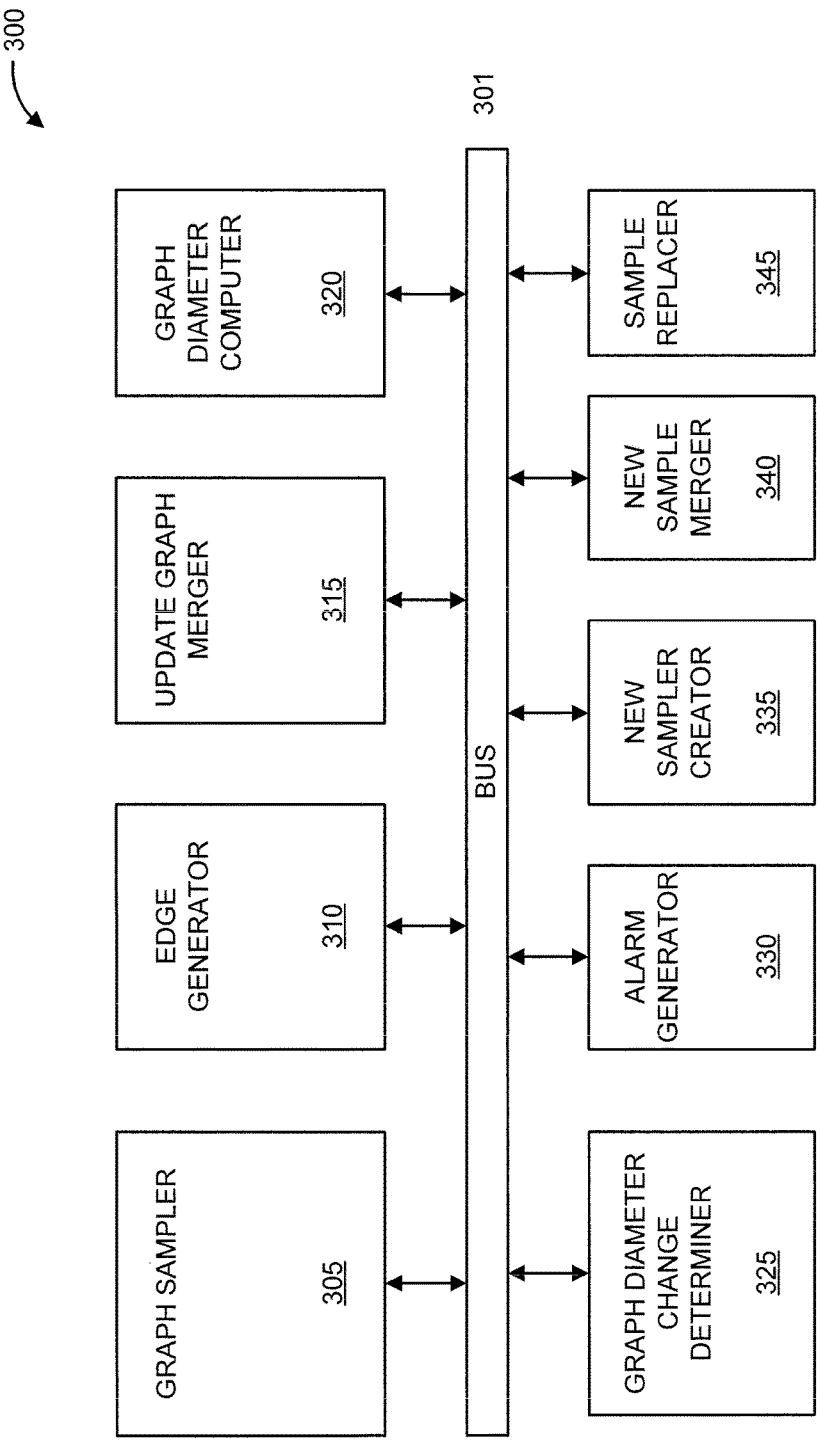
FIG. 3 shows an exemplary system 300 for abnormal change detection in graphs, in accordance with an embodiment of the present principles.

Moreover, it is to be appreciated that systems 200 and 300 described below with respect to FIGS. 2 and 3 are systems for implementing respective embodiments of the present principles. Part or all of processing system 100 may be implemented in one or more of the elements of any of system 200 and system 300.

Figure 4:
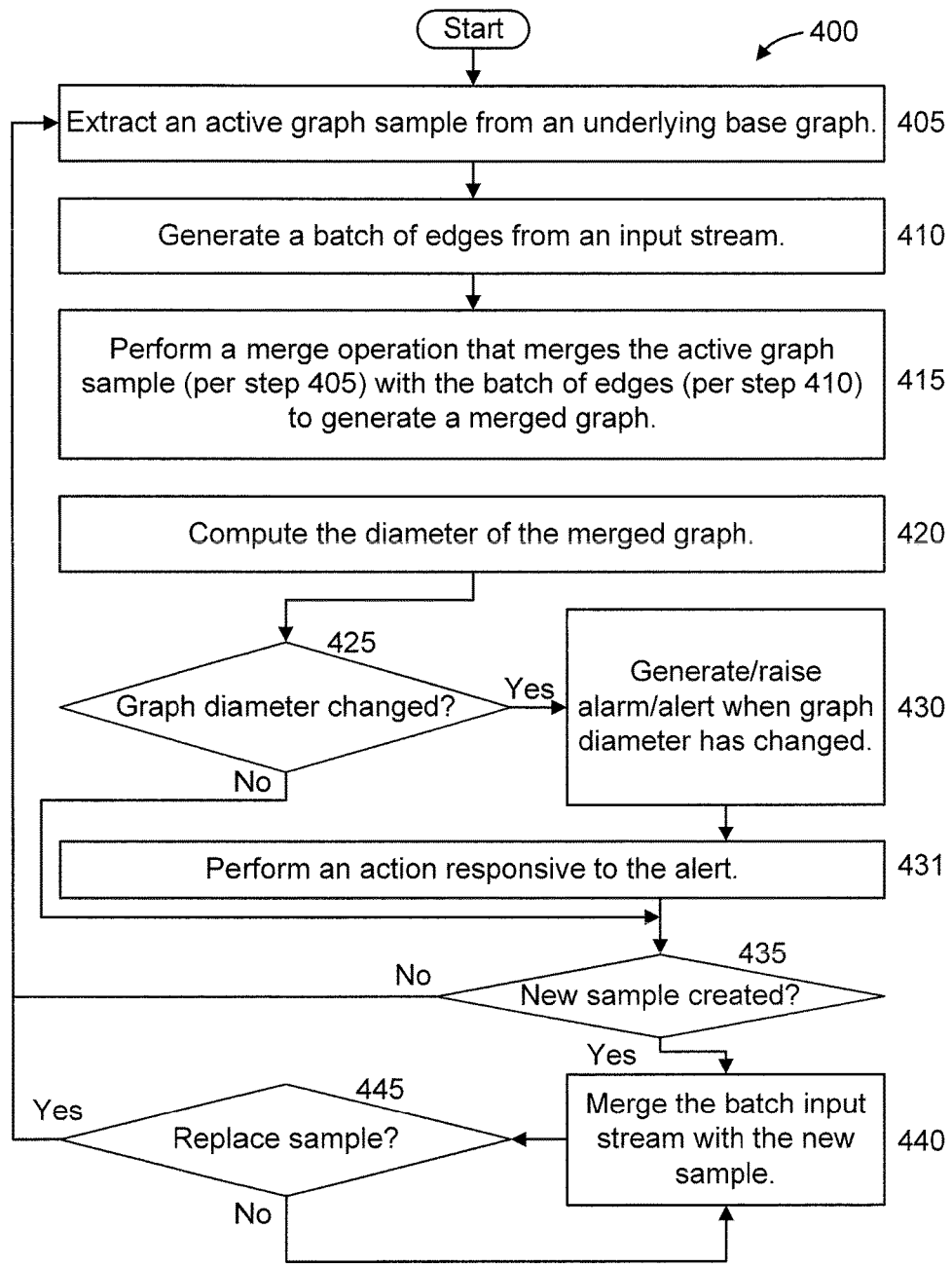
FIG. 4 shows an exemplary method 400 for abnormal change detection in graphs, in accordance with an embodiment of the present principles.
Figure 5:
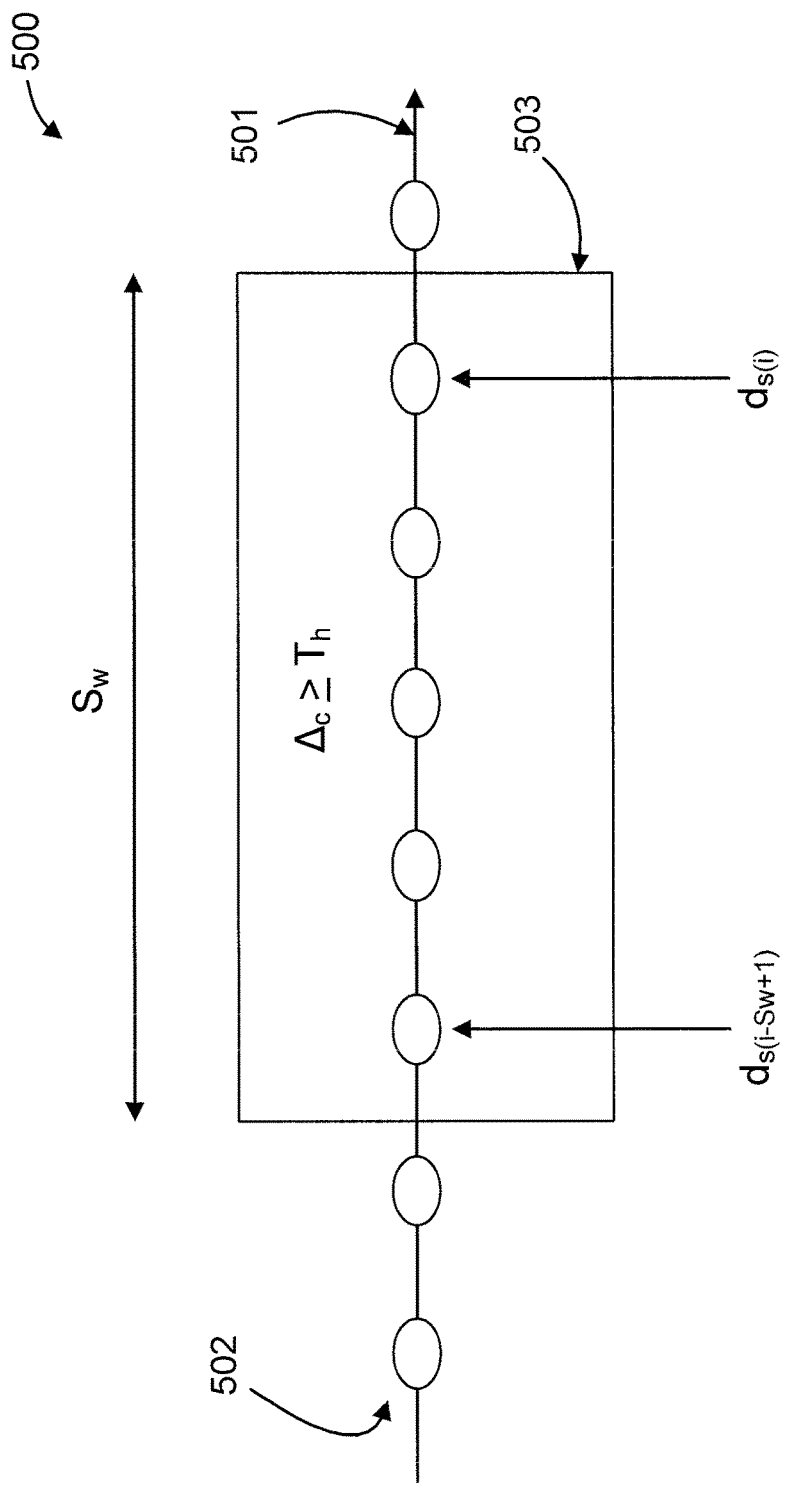
FIG. 5 graphically shows an exemplary method 500 for determining change in graph diameter, in accordance with an embodiment of the present principles.
Figure 6:
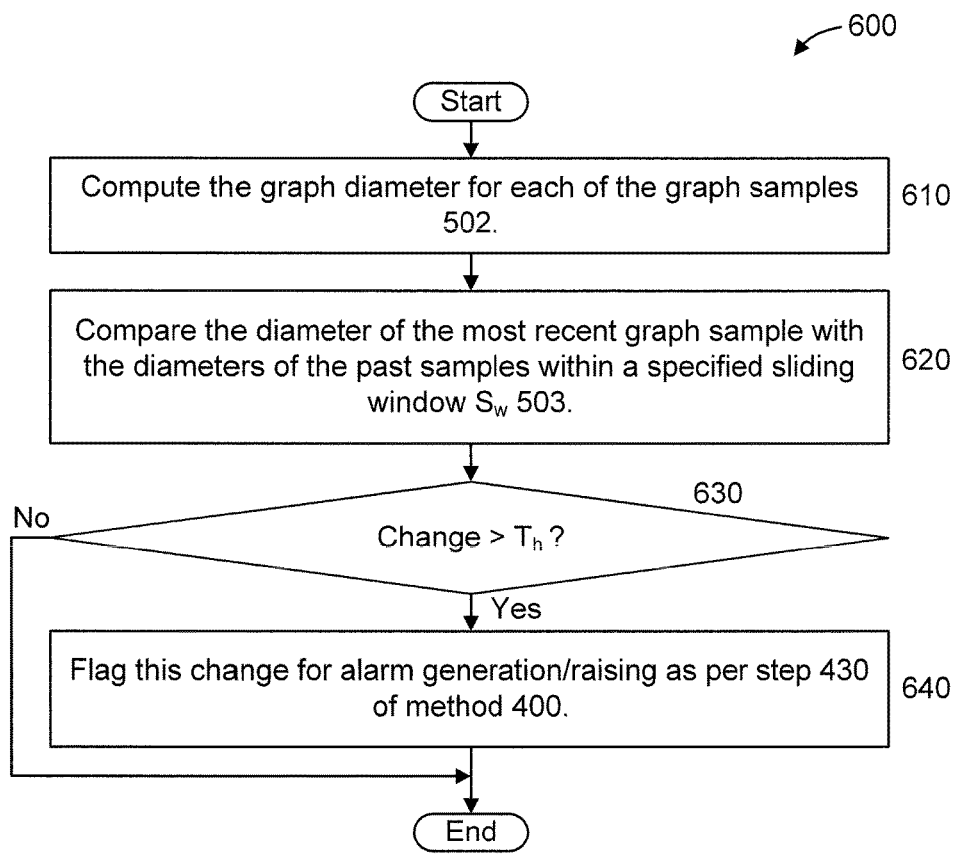
FIG. 6 shows an exemplary method 600 for determining change in graph diameter based on method 500 of FIG. 5, in accordance with an embodiment of the present principles.
Figure 7:
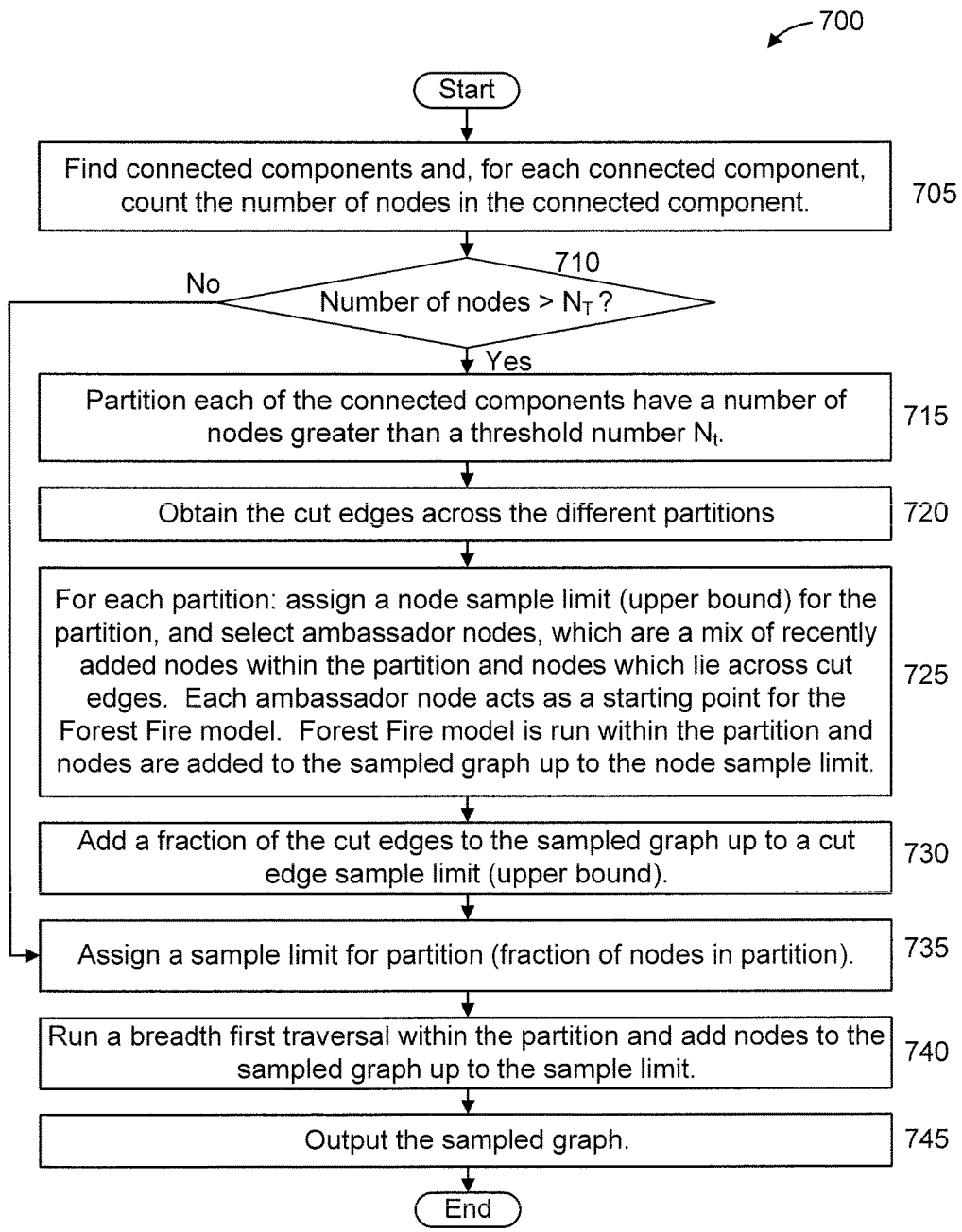
FIG. 7 shows an exemplary method 700 for graph sampling, in accordance with an embodiment of the present principles.

Further, it is to be appreciated that processing system 100 may perform at least part of the methods described herein including, for example, at least part of method 400 of FIG. 4 and/or at least part of method 500 of FIG. 5 and/or at least part of method 600 of FIG. 6 and/or at least part of method 700 of FIG. 7. Similarly, part or all of system 200 may be used to perform at least part of method 400 of FIG. 4 and/or at least part of method 500 of FIG. 5 and/or at least part of method 600 of FIG. 6 and/or at least part of method 700 of FIG. 7. Also, part or all of system 300 may be used to perform at least part of method 400 of FIG. 4 and/or at least part of method 500 of FIG. 5 and/or at least part of method 600 of FIG. 6 and/or at least part of method 700 of FIG. 7.

FIG. 2 shows an exemplary system 200 for large-scale, dynamic graph storage and processing, in accordance with an embodiment of the present principles.

The system 200 includes: a real-time processing sub-system 205; a server (ingest node) 210; a real-time, in memory graph storage device 215; a glue device 220; a live graph updates 225; a scalable, distributed, fault-tolerant, in-memory graph storage device 230; an in-memory graph sampler 235; a query manager 240; an online, incremental graph computer 245; an online, non-incremental graph computer 250; and an offline graph computer 255.

The real-time processing sub-system 205 continuously receives streaming updates. The sub-system 205 processes the incoming data stream and obtains a single graph operation or a set of graph operations to be performed. The graph operations can be, but are not limited to, adding or removing vertices and edges in the graph. The logic to obtain the graph updates can be customized according to the domain. These graph updates are communicated to the server 210 along with the timestamp of the update.

The server 210 (ingest node) receives graph updates from the real-time processing sub-system 205. The server 210 continuously listens for graph updates and processes them as soon as they are received. The server 210 acts as the entry point for the graph operation and serves as the ingest node. Whenever an update is received, the server 210 immediately pushes the update into the real-time, in memory graph storage device 215. Updates are pushed in the same sequence as they are received, thus maintaining the temporal evolution of the graph.

The real-time, in memory graph storage device 215 receives newly received graph updates that are pushed by the server 210 into the storage device 215. In an embodiment, the storage device 215 is highly optimized for fast graph updates. The rate of updates can be extremely fast in some applications and the highly efficient data structures of this real-time graph storage device 215 makes it possible to rapidly ingest them into the system. The timestamp is also stored, which makes it possible to maintain the exact sequence of the operations. A role of the real-time, in-memory graph storage device 215 is to continuously assimilate new graph updates at a very rapid pace.

The glue device 220 connects different parts of the system 200. The glue device 220 provides three key functionalities. The glue device retires updates in the order they were received from the real-time, in-memory graph storage device 215 and (1) pushes them into the scalable, distributed, fault-tolerant, in-memory graph storage device 230, (2) publishes them as live feeds for online, incremental graph algorithms, and (3) merges them into the latest graph samples being used for online, approximate, non-incremental graph algorithms.

These operations are continuously performed by the glue device 220 in the background, in parallel to the graph insertion performed by the server (ingest node) 210. By performing these operations continuously, it hides the time taken to update the distributed storage device 230 from the application, helps in keeping the memory footprint of the real-time graph storage device 215 very small and acts as the base for online applications.

The live graph updates 225 are published by the glue device 220 for online applications. These live graph updates are published in the same order as they were received by the server (ingest node) 210. Online applications rely on these live feeds for the latest graph changes and take appropriate actions. There is slight delay between the exact time of graph update and it being seen by the online applications. The live feeds are retired after their consumption by all online applications.

The scalable, distributed, fault-tolerant, in-memory graph storage device 230 represents the main storage layer for the underlying graph. The data structures used for graph storage in quite different from the one used in the real-time, in memory graph storage device 215 and are efficient for retrieval and query processing rather than fast updates. The graph structure is partitioned across multiple nodes and stored in-memory for low-latency retrieval. Data is replicated across nodes, which provides fault tolerance in the case where any of the nodes go down. Graph vertices, along with their incoming and outgoing edges, are indexed for efficient retrieval. Temporal information is also stored, thus enabling temporal queries along with structural queries on the graph. The scalable, distributed, fault-tolerant, in-memory graph storage device 230 is continuously updated by the glue by pulling latest graph changes from the real-time, in memory graph storage device 215 into this permanent graph storage layer.

The in-memory graph sampler 235 is used in consideration of the fact that as the size of the graph grows, it becomes increasingly slow for non-incremental graph computations. Thus, in some applications, it is okay to perform the same batch-type computation on a sampled graph to obtain quick, approximate results. This functionality is provided by system 200 through the in-memory graph sampler 235. The distributed, in-memory graph storage device 230 is periodically probed to create a graph sample and this sample is later used by the online applications relying on non-incremental, approximate graph computations. One important point to note is that the graph sample is also merged with the live feeds being pulled by the glue device 220 from the real-time, in memory graph storage device 215. This helps the graph sample to also include some of the latest changes to the graph structure, which might be important for some applications. The exact method and size of graph samples can be changed and customized based on the application requirements. Applications can explore the trade-off between accuracy and response time using different sizes of graph samples. The nomenclature "in-memory" in "in-memory graph sampler" refers to the use of non-disk-based memory for storing the samples, to provide quick access to the samples by avoiding the latencies associated with disk-based memory. Thus, in the embodiment of FIG. 2, the sampler 235 includes non-disk-based memory for storing the samples.

The query manager 240 is the interface between the applications and the underlying graph processing system. It has access to different components of the system and responds to queries by consulting appropriate components. The main components that the query manager consults are the real-time, in-memory graph storage device 215, the live graph updates 225, the scalable, distributed, fault-tolerant, in-memory graph storage device 230, and the in-memory graph sampler 235.

Each of these components includes different types of information related to the underlying graph. The real-time, in-memory graph storage device 215 includes the latest and most up-to-date changes to the graph. The live graph updates 225 include the live feeds of the changes occurring in the graph. The scalable, distributed, fault-tolerant, in-memory graph storage device 230 represents the underlying base graph without the information in the real-time, in-memory graph storage device 215. The real-time, in-memory graph storage device 215 and the scalable, distributed, fault-tolerant, in-memory graph storage device 230 together include the most up-to-date, complete graph structure. The in-memory graph sampler 235 includes the graph samples merged with the latest changes in the graph. The query manager 240 analyses the query and picks data from one or multiple of these to respond to the query. Queries requiring exact information about the past and the current are usually responded with the real-time, in-memory graph storage device 215 and the scalable, distributed, fault-tolerant, in-memory graph storage device 230. Queries from online, incremental applications are responded using the live graph updates 225. If the applications require quick, approximate results, then the in-memory graph sampler 235 is consulted. The scheduling mechanism in the query manager 240 can be configured and prioritized according to the application priority.

The online, incremental graph computer 245 is used in consideration of these types of applications relying on the live feeds related to the changes in the graph. These live updates are captured by incremental graph algorithms in the online, incremental graph computer 245 and the state is quickly re-established based on these latest changes.

The online, non-incremental graph computer 250 is used in consideration of the fact that some algorithms used by such applications cannot be expressed in the form of incremental graph computation. Some of these applications can benefit from the graph samples provided by the system 200 to get some quick, approximate responses.

The offline graph computer 255 performs the classic batch-style iterative graph computations which are compute intensive. These are not very time-sensitive and are performed offline as low-priority jobs.

Advantageously, system 200 enables fast graph updates, maintains distributed, fault-tolerant temporal graph storage and provides mechanisms for online as well as offline graph computation with exact and approximate results.

Moreover, system 200 advantageously serves as a common platform for distributed, temporal graph storage and graph processing. Applications can be written for online as well as offline analysis. Online, incremental versions can obtain exact computation results, while non-incremental versions can obtain quick, approximate results from the graph samples provided by system 200.

FIG. 3 shows an exemplary system 300 for abnormal change detection in graphs, in accordance with an embodiment of the present principles. One or more of the elements of system 300 may be included and/or otherwise performed by one or more of the elements of system 200. System 300 is specifically directed to abnormal graph detection while system 200 is directed to a system for overall graph processing and, as such, the functions of the elements of system 300 may be subsumed by the elements of system 200. Thus, in an embodiment, system 300 can be considered as a subsystem of system 200. In other embodiments, system 300 can be considered a standalone system with respect to system 200.

The system 300 includes: a graph sampler 305; an edge generator 310; an update graph merger 315; a graph diameter computer 320; a graph diameter change determiner 325; an alarm generator 330; a new sample creator 335; a new sample merger 340; and a sample replacer 345.

The graph sampler 305 extracts (by sampling) an active graph sample from an underlying base graph. In an embodiment, the active graph sample represents a much smaller graph extracted from the underlying base graph. Sampling the graph reduces the computation time and provides change detection in real time. In an embodiment, the graph sampler 305 is a processor-based device for sampling underlying or base graphs to generate an active graph sample (active sampled graph).

The edge generator 310 generates a batch of edges from an input stream. The edge generator 310 processes the raw data from the input stream and generates/performs a set of graph operations such as adding an edge between two vertices in a graph to provide temporally ordered data from the processed input stream. The set of graph operations are later used to combine with the latest graph sample, resulting in a new sampled graph, which has a representation of the original graph and the latest modifications to the graph.

The update graph merger 315 performs a merge operation to merge (e.g., superimpose) the graph updates arriving from the input stream with (e.g., on) the latest graph sample to generate a new graph sample.

The graph diameter computer 320 computes the diameter of the sample. The graph diameter is computed on the graph sample generated by the merge operation performed by the graph merger 315. In an embodiment, the graph diameter computer 320 is a processor-based device for performing graph diameter computations.

The graph diameter change determiner 325 determines whether the graph diameter has changed. In an embodiment, the graph diameter change determination device 325 performs method 500 shown in FIG. 5 to determine change in graph diameter.

The alarm generator 330 generates and/or otherwise raises an alarm/alert when the graph diameter has changed. The alert device 330 can use different ways to provide the alert, depending upon the implementation (e.g., different domains have different alerts associated therewith).

The new sample creator 335 creates new samples for change detection. While shown as a separate element, in another embodiment, the new sample creator 335 can be incorporated into the graph sampler 305.

The new sample merger 340 merges the batch input stream with the new sample (created by the new sample creator 335).

The sample replacer 345 replaces/updates the sample using updates from the batch input stream. In an embodiment, such replacement/updating is performed with respect to a sliding window as described in further detail herein.

In the embodiment shown in FIG. 3, the elements thereof are interconnected by a bus 301. However, in other embodiments, other types of connections can also be used. Moreover, in an embodiment, at least one of the elements of system 300 is processor-based. Further, while one or more elements may be shown as separate elements, in other embodiments, these elements can be combined as one element. The converse is also applicable, where while one or more elements may be part of another element, in other embodiments, the one or more elements may be implemented as standalone elements. These and other variations of the elements of system 300 are readily determined by one of ordinary skill in the art, given the teachings of the present principles provided herein, while maintaining the spirit of the present principles.

FIG. 4 shows an exemplary method 400 for abnormal change detection in graphs, in accordance with an embodiment of the present principles. The method 400 is used with a system for abnormal change detection in graphs such as, for example, system 300. For the sake of brevity and illustration, some of the steps that can be performed by system 300 have been omitted and/or are otherwise implied.

At step 405, extract an active graph sample (also interchangeably referred to herein as "active sampled graph") from an underlying base graph.

In an embodiment, the active graph sample represents a much smaller graph extracted from the underlying base graph. Sampling the graph reduces the computation time and provides change detection in real time. Extracting a graph sample to be used for abnormal change detection is a non-trivial task. In an embodiment, the active graph sample is constructed in a specific manner such that the likeliness of missing an abnormal change is minimized.

At step 410, generate a batch of edges from an input stream.

In an embodiment, step 410 represents the temporally ordered data coming from the processed input stream. The input stream of raw data is processed and a set of graph operations like adding an edge between two vertices in a graph is generated/performed. This set of graph operations are later used to combine with the latest graph sample, resulting in a new sampled graph, which has a representation of the original graph and the latest modifications to the graph.

At step 415, perform a merge operation that merges the active graph sample (per step 405) with the batch of edges (per step 410) to generate a merged graph.

In an embodiment, the graph updates arriving from the input stream are merged (e.g., superimposed) on the latest graph sample to generate a new graph sample. This merge operation ensures that the latest changes to the graph are captured by the graph sample on which the diameter would be computed. Abnormal change detection involves comparing the latest changes with respect to the changes in the recent past. The merge operation aids in doing that, and is a significant component in the overall change detection procedure.

At step 420, compute the diameter of the merged graph.

In an embodiment, the graph diameter for a graph G with V vertices and E edges is given by:

$$\text{diameter}(G(V,E)) = \sum_{i=0}^{i=v-1} e(v_i)/V$$

where $e(v_i)$=Length of longest shortest path from vertex $v_i$ to any other vertex.

Any algorithm including, e.g., Dijkshtra's algorithm, can be used to compute shortest path between all pairs of vertices in the graph. The graph diameter is computed on the graph sample generated by the merge operation in block 415.

At step 425, determine whether the graph diameter has changed. In an embodiment, the method 500 shown in FIG. 5 is used to determine change in graph diameter.

At step 430, generate and/or otherwise raise an alarm/alert when the graph diameter has changed.

Step 430 involves providing a notification of a possible abnormal change. In an embodiment, the way to notify of change could be different for each domain. It is desirable to have a minimum number, if any, of false negatives and false positives. A false negative corresponds to an event that has happened but was not detected by the system. A false positive corresponds to a scenario where no significant event has happened but still the system has raised an alarm. In an embodiment, the alert is a user-perceivable alert that is perceived by the user through a sense (e.g., sight, hearing, touch, etc.) of the user. Of course, other types of alerts can also be generated, while maintaining the spirit of the present principles.

At step 431, perform an action responsive to the alert. The action is dependent upon the implementation. For example, in the case of a virus being presumed to exist due to the alert, the action can be initiating a virus scan and removal action on a computer. In the case of new such as, for example, a calamity, sending target alerts to users, for example, on their cell phones or other personal devices can enable them to avoid and/or otherwise take action to avoid or mitigate effects of the calamity on them. For example, in the case of a flood, people can be warned so that they can find high ground. The preceding actions are merely illustrative and, thus, other actions, as related to the underlying cause for the alert, can be taken, while maintaining the spirit of the present principles.

At step 435, determine whether a new sample has been created. If so, then the method proceeds to step 440. Otherwise, the method returns to step 405.

In an embodiment, the graph sample is periodically refreshed. In an embodiment, step 435 involves checking whether or not the new sample is ready to be used for the change detection. Sample creation is described in further detail herein below.

At step 440, merge the batch input stream with the new sample (determined to be created at step 435).

Step 440 ensures that the new sample has enough reference points to make the decision (once it becomes active) about abnormal change and raise an alert. This is like building up the most recent history for this new sample and catching up with the latest changes in the graph. It is desired for the new sample to build up these reference points to reduce the number of false positives and also to minimize the false negatives. In an embodiment, further processing and/or use of a new sample is stalled until it has a sufficient number of reference points.

At step 445, determine whether to replace the sample. If so, then the method returns to step 405. Otherwise, the method returns to step 440, where the still current sample is merged with newly updated batch data from the batch input stream.

In an embodiment, the new sample continues to be updated with the batch input stream for at least the duration of the specified sliding window. This sample is made active and used for abnormal change detection immediately after the window is reached and the process of sample creation is initiated. This process continues and periodically the system receives fresh samples, does a merge operation with the latest input batch stream and continuously monitors for abnormal changes happening in the underlying network.

One or more corrective actions can be taken upon detecting an abnormal change. The action will depend upon the implementation and the content that the graph corresponds to. For example, in the case of virus detection, a virus scan and cleaning can be performed. These and other corrective actions are readily determined by one of ordinary skill in the art given the teachings of the present principles provided herein, while maintaining the spirit of the present principles.

FIG. 5 graphically shows an exemplary method 500 for determining change in graph diameter, in accordance with an embodiment of the present principles. FIG. 6 shows an exemplary method 600 for determining change in graph diameter based on method 500 of FIG. 5, in accordance with an embodiment of the present principles. FIGS. 5 and 6 correspond to step 425 of method 400.

The line 501 represents the timeline and the dots on the timeline represent the graph samples (where the dots in FIG. 5 and the graph samples in the corresponding description herein relating to FIG. 5 are collectively denoted by the reference numeral 502) generated by the merge operation in step 415 of method 400. The graph samples 502 include a graph sample $d_{s(i-Sw+1)}$ and a graph sample $d_{s(i)}$.

At step 610, compute the graph diameter for each of the graph samples 502.

At step 620, compare the diameter of the most recent graph sample with the diameters of the past samples within a specified sliding window $S_w$ 503.

At step 630, determine if a change in the diameter is greater than or equal to a specified threshold $T_h$. If so, then the method proceeds to step 640. Otherwise, the method is terminated.

At step 640, flag this change for alarm generation/raising as per step 430 of method 400.

Regarding steps 630 and 640, both $S_w$ 503 and $T_h$ are tunable parameters. In an embodiment, both $S_w$ 503 and $T_h$ can be set by the domain experts, based on their experience about the nature of evolution of the graph in their domain. The sliding window 503 is continuously shifted such that only diameters within the sliding window 503 are monitored and the decision of whether or not to raise an alert is taken.

A description will now be given regarding sample creation, in accordance with an embodiment of the present principles.

The present principles extract the graph sample in a manner such that all sections of the graph are covered and the evolutionary nature of the graph is preserved. To cover all sections of the graph, the graph is first split into different connected components and then the larger connected components are partitioned. After the partitioning is done, a Forest Fire model can be used in each partition, and later, edges across partitions are pushed into the sample to connect the partitions and form a representative graph sample. The pseudo-code for partitioned Forest Fire is given below:

```
Pseudo-code for Partitioned Forest Fire:

Input Base Graph
Output Sampled Graph
Function PartitionedForestFireSampling(Graph G) {
    // Find connected components
    ConnectedComponents <- GetListOfConnectedComponents(G);
    For each connected component Ci in Connected Components do
        // Check number of nodes in connected components
        if N_i > N_t then
            // Partition components with number of nodes greater than
            threshold N_t
            Partitions <- K-wayPartitionComponent(Ci, k)
            // Get cut edges across different partitions
            CutEdgesList <- GetCutEdges(C_i)
            For each partition p in Partitions do
                // Assign sample limit for partition - fraction (ρ) of
                Nodes
N_{p(i)}           sampleLimit(P_i) <- ρ * N_{p(i)}
                // Choose ambassador nodes for forest fire
                // Mix of cut edges and recent nodes from the partition
                AmbassadorNodesList <-
                ChooseAmbassadorNodes(CutEdgesList, P_i)
                // Add nodes to sample using Forest Fire model
                S <- S + ForestFire(AmbassadorNodesList,
            sampleLimit(P_i))
            End For
            // Add fraction (α) of cut edges to the sample
            S <- S + AddCutEdges(CutEdgeList, α)
        Else
            // Assign sample limit for partition - fraction (ρ) of Nodes
            in the partition
            sampleLimit(C_i) <- ρ * N_i
            // Run Breadth first traversal and add nodes to the sample
            S <- S + BFS(sampleLimit(C_i));
        End if
    }
    End For
    // Return graph sample
    Return S
End Function
```

FIG. 7 shows an exemplary method 700 for graph sampling, in accordance with an embodiment of the present principles. The input to method 700 is an underlying or base graph and the output is a sampled graph.

At step 705, find connected components and, for each connected component, count the number of nodes in the connected component.

At step 710, determine if the number of nodes is greater than a threshold number $N_t$. If so, then the method proceeds to step 715. Otherwise, the method proceeds to step 735.

At step 715, partition each of the connected components have a number of nodes greater than a threshold number $N_t$.

At step 720, obtain the cut edges across the different partitions. A cut edge refers to an edge which connects two partitions within a connected component. Cut edges are obtained across different partitions within a connected component. This is repeated for each connected component, which has a number of nodes greater than threshold number Nt.

At step 725, for each partition: assign a node sample limit (upper bound) for the partition (e.g., a fraction of the nodes in the partition), and select ambassador nodes, which are a mix of recently added nodes within the partition and nodes which lie across cut edges. Each ambassador node acts as a starting point for the Forest Fire model. The Forest Fire model is run within the partition and nodes are added to the sampled graph (that will form the output of method 700) up to the node sample limit.

At step 730, add a fraction of the cut edges to the sampled graph (that will form the output of method 700) up to a cut edge sample limit (upper bound).

At step 735, assign a sample limit for the partition, that is, a fraction of the nodes in the partition.

At step 740, run a breadth first traversal within the partition and add nodes to the sampled graph (that will form the output of method 700) up to the sample limit.

At step 745, output the sampled graph.

A description will now be given of some of the many benefits/advantages provided by the present principles.

The proposed solution will help in detecting abnormal changes (as they are happening) in an online, rapidly evolving graph. This will have different implications in different application domains and is an important step towards identifying the cause of the event and reacting appropriately. Some of the example applications include, but are not limited to: (1) preventing network failure/system crash in case of virus propagation in an enterprise network; (2) targeting advertisements to group of people spreading news about certain events or products; providing relief to people spreading news about a natural calamity or a disaster in a specific region; spreading awareness and alert people in case of spread of news related to an epidemic; and providing recommendations to users who might be interested in some popular news, events, products, movies, music, and so forth.

Embodiments described herein may be entirely hardware, entirely software or including both hardware and software elements. In a preferred embodiment, the present invention is implemented in software, which includes but is not limited to firmware, resident software, microcode, etc.

Embodiments may include a computer program product accessible from a computer-usable or computer-readable medium providing program code for use by or in connection with a computer or any instruction execution system. A computer-usable or computer readable medium may include any apparatus that stores, communicates, propagates, or transports the program for use by or in connection with the instruction execution system, apparatus, or device. The medium can be magnetic, optical, electronic, electromagnetic, infrared, or semiconductor system (or apparatus or device) or a propagation medium. The medium may include a computer-readable medium such as a semiconductor or solid state memory, magnetic tape, a removable computer diskette, a random access memory (RAM), a read-only memory (ROM), a rigid magnetic disk and an optical disk, etc.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended, as readily apparent by one of ordinary skill in this and related arts, for as many items listed.

The foregoing is to be understood as being in every respect illustrative and exemplary, but not restrictive, and the scope of the invention disclosed herein is not to be determined from the Detailed Description, but rather from the claims as interpreted according to the full breadth permitted by the patent laws. Additional information is provided in an appendix to the application entitled, "Additional Information". It is to be understood that the embodiments shown and described herein are only illustrative of the principles of the present invention and that those skilled in the art may implement various modifications without departing from the scope and spirit of the invention. Those skilled in the art could implement various other feature combinations without departing from the scope and spirit of the invention.

What is claimed is:

1. A method for detecting abnormal changes in real-time in dynamic graphs, the method comprising:
reducing computation time for detection of the abnormal changes in real-time by extracting, by a graph sampler, an active sampled graph from an underlying base graph, the extracting comprising:
partitioning each of one or more connected components, and assigning a node sample limit for each of one or more partitions;
selecting ambassador nodes, the ambassador nodes being a mix of recently added nodes within the one or more partitions and nodes lying across cut edges, wherein a cut edge connects two partitions within a connected component, each ambassador node functions as a starting point for a Forest Fire model which is a cellular automaton on a grid of a plurality of cells, each cell comprises one of three states: empty, occupied by a tree, or burning, and the Forest Fire model being run within the one or more partitions;
adding one or more nodes to the active sampled graph until the node sample limit of the partition associated with the active sample graph is reached; and
partitioning the active sampled graph across multiple nodes and storing the active sampled graph in a memory for low-latency retrieval;
merging, by a graph merger, the active sampled graph with graph updates within a predetermined recent time period to generate a merged graph;
computing, by a graph diameter computer, a diameter of the merged graph;
determining, by a graph diameter change determination device, whether a graph diameter change exists; and
generating, by an alarm generator, a user-perceptible alarm responsive to the graph diameter change.

2. The method of claim 1, wherein the determining whether the graph diameter change exists comprises comparing the diameter of the merged graph with one or more diameters of one or more past sampled graphs.

3. The method of claim 2, wherein the comparing step compares the diameter of the merged graph with the one or more diameters of the one or more past sampled graphs using a sliding window.

4. The method of claim 3, wherein a target time period of the sliding window is continuously shifting.

5. The method of claim 3, further comprising updating the merged graph using a batch input stream for at least a duration of the sliding window.

6. The method of claim 2, wherein the determining whether the graph diameter change exists comprises comparing the diameter of the merged graph with the one or more diameters of the one or more past sampled graphs with respect to a threshold amount of diameter change.

7. The method of claim 1, further comprising determining whether the merged graph has a sufficient number of reference points, and wherein the computing of the diameter of the merged graph is stalled until the merged graph has the sufficient number of reference points.

8. The method of claim 1, wherein the extracting the active sampled graph from the underlying base graph comprises selecting graph samples such that all sections of the underlying graph are processed and represented in the active sampled graph.

9. A computer program product for detecting abnormal changes in real-time in dynamic graphs, the computer program product comprising a non-transitory computer readable storage medium having program instructions embodied therewith, the program instructions executable by a computer to cause the computer to perform a method comprising:
reducing computation time for detection of the abnormal changes in real-time by extracting, by a graph sampler, an active sampled graph from an underlying base graph, the extracting comprising:
partitioning each of one or more connected components, and assigning a node sample limit for each of one or more partitions;
selecting ambassador nodes, the ambassador nodes being a mix of recently added nodes within the one or more partitions and nodes lying across cut edges, wherein a cut edge connects two partitions within a connected component, each ambassador node functions as a starting point for a Forest Fire model which is a cellular automaton on a grid of a plurality of cells, each cell comprises one of three states: empty, occupied by a tree, or burning, and the Forest Fire model being run within the one or more partitions;
adding one or more nodes to the active sampled graph until the node sample limit of the partition associated with the active sample graph is reached; and
partitioning the active sampled graph across multiple nodes and storing the active sampled graph in a memory for low-latency retrieval;
merging, by a graph merger, the active sampled graph with graph updates within a predetermined recent time period to generate a merged graph;
computing, by a graph diameter computer, a diameter of the merged graph;
determining, by a graph diameter change determination device, whether a graph diameter change exists; and
generating, by an alarm generator, a user-perceptible alarm responsive to the graph diameter change.

10. The computer program product of claim 9, wherein the determining whether the graph diameter change exists comprises comparing the diameter of the merged graph with one or more diameters of one or more past sampled graphs.

11. The computer program product of claim 10, wherein the comparing step compares the diameter of the merged graph with the one or more diameters of the one or more past sampled graphs using a sliding window.

12. The computer program product of claim 11, wherein a target time period of the sliding window is continuously shifting.

13. The computer program product of claim 11, further comprising updating the merged graph using a batch input stream for at least a duration of the sliding window.

14. The computer program product of claim 10, wherein the determining whether the graph diameter change exists comprises comparing the diameter of the merged graph with the one or more diameters of the one or more past sampled graphs with respect to a threshold amount of diameter change.

15. The computer program product of claim 9, further comprising determining whether the merged graph has a sufficient number of reference points, and wherein the computing of the diameter of the merged graph is stalled until the merged graph has the sufficient number of reference points.

16. The computer program product of claim 9, wherein the extracting the active sampled graph from the underlying base graph comprises selecting graph samples such that all sections of the underlying graph are processed and represented in the active sampled graph.

17. A system for detecting abnormal changes in real-time in dynamic graphs, the system comprising:
  a graph sampler for reducing computation time for detection of the abnormal changes in real-time by extracting an active sampled graph from an underlying base graph, the extracting comprising:
    partitioning, using a hardware processor, each of one or more connected components, and assigning a node sample limit for each of one or more partitions;
    selecting ambassador nodes, the ambassador nodes being a mix of recently added nodes within the one or more partitions and nodes lying across cut edges, wherein a cut edge connects two partitions within a connected component, each ambassador node functions as a starting point for a Forest Fire model which is a cellular automaton on a grid of a plurality of cells, each cell comprises one of three states: empty, occupied by a tree, or burning, and the Forest Fire model being run within the one or more partitions;
    adding one or more nodes to the active sampled graph until the node sample limit of the partition associated with the active sample graph is reached; and
    partitioning the active sampled graph across multiple nodes and storing the active sampled graph in a memory for low-latency retrieval;
  a graph merger for merging the active sampled graph with graph updates within a predetermined recent time period to generate a merged graph;
  a graph diameter computer for computing a diameter of the merged graph;
  a graph diameter change determination device for determining whether a graph diameter change exists; and
  an alarm generator for generating a user-perceptible alarm responsive to the graph diameter change.

18. The system of claim 17, wherein the graph diameter change determination device compares the diameter of the merged graph with one or more diameters of one or more past sampled graphs.

19. The system of claim 18, wherein the diameter of the merged graph is compared with the one or more diameters of the one or more past sampled graphs using a sliding window.

20. The system of claim 19, wherein a target time period of the sliding window is continuously shifting.

* * * * *